United States Patent
Schneider et al.

(10) Patent No.: US 12,203,247 B2
(45) Date of Patent: Jan. 21, 2025

(54) WATER SUPPLY AND DISTRIBUTION SYSTEM ON-BOARD AN AIRCRAFT AND METHOD FOR SELF-SUSTAINING HYGIENIC OPERATION OF SUCH SYSTEM

(71) Applicant: Airbus Operations GmbH, Hamburg (DE)

(72) Inventors: Frank Schneider, Hamburg (DE); Hannes Müller, Hamburg (DE); Axel Schreiner, Bremen (DE); Tim Lübbert, Wedel (DE); Frederik Albers, Ahlerstedt (DE); Michael Rempe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/238,147

(22) Filed: Aug. 25, 2023

(65) Prior Publication Data
US 2024/0068206 A1    Feb. 29, 2024

(30) Foreign Application Priority Data
Aug. 29, 2022 (EP) .................................. 22192703-1

(51) Int. Cl.
*E03B 1/04* (2006.01)
(52) U.S. Cl.
CPC .................................. *E03B 1/042* (2013.01)
(58) Field of Classification Search
CPC .... E03B 1/042; B64F 5/30; A61L 2/04; C02F 1/02; C02F 2201/008; C02F 2303/04; C02F 2209/02
See application file for complete search history.

(56) References Cited

U.S. PATENT DOCUMENTS

| 9,273,449 B2 * | 3/2016 | Burd ..................... B64D 11/02 |
| 2003/0189002 A1 * | 10/2003 | Proulx ................ B01D 24/008 210/284 |

(Continued)

FOREIGN PATENT DOCUMENTS

EP    3385361 A1    10/2018

OTHER PUBLICATIONS

European Search Report for Application No. 22192703 dated Feb. 13, 2023.

*Primary Examiner* — P. Macade Nichols
(74) *Attorney, Agent, or Firm* — KDW Firm PLLC

(57) ABSTRACT

A method for operating an on-board water supply and distribution system of an aircraft for supplying water includes a central water tank, first consumer assemblies with buffer tanks each including a heater to heat up water in the buffer tank to a disinfection temperature, pump having upstream and downstream sides to operate in supply and reverse modes, and high-pressure conduit system. The central water tank connects to the pump's upstream side. The conduit system connects the downstream side with a first consumer assembly. The method includes operating the pump in supply mode where water from the central tank goes to a first consumer assembly to fill a buffer tank, operating a buffer tank heater so water heats to a predetermined disinfection temperature, and operating the pump in reverse mode so heated water passes through a part of the conduit system and the upstream side of the pump.

15 Claims, 3 Drawing Sheets

(56) References Cited

U.S. PATENT DOCUMENTS

| | | |
|---|---|---|
| 2006/0169645 A1 | 8/2006 | Hsueh |
| 2014/0102553 A1* | 4/2014 | Burd .................... B64D 11/04 |
| | | 137/315.01 |
| 2019/0365936 A1 | 12/2019 | Flashaar |

* cited by examiner

WATER SUPPLY AND DISTRIBUTION SYSTEM ON-BOARD AN AIRCRAFT AND METHOD FOR SELF-SUSTAINING HYGIENIC OPERATION OF SUCH SYSTEM

TECHNICAL FILED

The disclosure herein is directed to a method for operating a water supply and distribution system on-board an aircraft. The invention is further directed to a water supply and distribution system and an aircraft comprising such system.

BACKGROUND

Conventional water supply and distribution systems on-board commercial aircraft comprise pipework made from rigid pipes, i.e., rigid plumbing. Through the rigid pipes potable water is supplied from a central water tank to consumer assemblies such as sinks and toilets in a lavatory or steam ovens and sinks in a galley. In such prior art systems in order to convey the water from the central tank to the consumer assemblies, the tank is pressurized by the compressed air, i.e., bleed air or an air compressor generate an overpressure state in the central water tank. Only exceptionally centrifugal pumps are employed to convey the water to the consumer assemblies.

Recently, a high-pressure water supply system was introduced and it is described in EP 3 385 361 A1. Such industry-optimized water system architecture is based on the concept of a reduction of pipe cross-sections accompanied by an increase in pressure-level as well as a change of pressurization technology, i.e., rather than employing pressurized central water tanks or centrifugal pumps, displacement pumps are used. This adaption allows massive savings, e.g., weight, installation time, equipment cost etc.

Such high-pressure water systems are used in an aircraft to provide potable water in a sufficient amount and quality to all kinds of consumer equipment on-board large passenger aircraft. This in turn requires that hygienic requirements are fulfilled with these systems either, so that in order to guarantee hygienic water supply safety, a system disinfection must be performed at regular intervals. For this purpose, various methods are available, which are essentially based on a rinsing of the system with special disinfection fluids such as chlorides or ozone or with hot water.

However, these methods have several drawbacks. Firstly, in case of the use of disinfection fluids it is required that these mixtures are provided on the ground. Alternatively, it is necessary that external ground service equipment for hot water generation must be provided, which involves additional efforts as well. In particular, manual support of a partially automated process is required or the complete disinfection process has to be performed manually which involves additional work which has to be carried out by additional service personnel which also involves additional costs. In any case the disinfection process is accompanied with an operational interruption of the aircraft in question.

Moreover, there are technical boundary conditions that limit the efficiency of disinfection by hot water. In particular, in known water supply systems the effective disinfection temperature for hot water flushes is just 10K above the minimum temperature required for the hot water. While the minimum temperature for thermal disinfection with hot water is 60° C., the temperature of hot water which is initially pre-filled into the main water tank of a water supply system before it can be pumped through the system is limited to just 70° C. This is due to the fact that the tank inner-liner of standard fiber reinforced plastic tanks has a maximum tolerable temperature of around 70° C. Therefore, when using hot water to disinfect the water supply system, there is the risk the process is not sufficiently effective.

SUMMARY

Thus, it is an object of the disclosure herein to provide a method for operating an on-board water supply system in an aircraft as well as such system which allow for an efficient disinfection process without the need for significant maintenance efforts.

The object underlying the disclosure herein is solved by the subject matter disclosed herein.

In particular, in a first aspect of the disclosure herein, the above object is solved by a method for operating an on-board water supply and distribution system of an aircraft for supplying water.

The system comprises a central water tank, first consumer assemblies, wherein each first consumer assembly comprises a supply device and a buffer tank with each first consumer assembly being configured to supply water from the buffer tank via the supply device. Each of the buffer tanks of the first consumer assemblies comprises a heater configured to heat up water in the buffer tank to a disinfection temperature.

In particular, in a preferred embodiment, the heaters are configured such that they are capable of heating up water in the buffer tank to which they are associated to a temperature of at least 60° C., more preferably to at least 70° C. The temperature is preferably chosen such that thermal disinfection is achieved by the method of the disclosure herein. In this context, thermal disinfection means that the components of the water supply and distribution system, through which potable water is conveyed, are heated up to or above a disinfection temperature at which pathogenic germs on the inner surfaces of the water-bearing parts are eliminated or suppressed by thermal treatment. Further, the temperature is maintained in the water-carrying elements at or above the disinfection temperature for a disinfection period. This suppresses or prevents the formation of hygienically relevant germ colonization (in a biofilm) on the inner surfaces of the water-bearing parts of the water supply and distribution system of the disclosure herein.

Further, it is to be noted that the first consumer assemblies of the disclosure herein may comprise more than one supply device, e.g., a first consumer assembly in the form of a lavatory comprises a buffer tank provided with a heater and as supply devices a toilet and a sink with a faucet. In addition, besides first consumer assemblies comprising a buffer tank with a heater, the aircraft provided with the system of the disclosure herein may comprise additional consumer assemblies that have a buffer tank without a heater.

Further, the system comprises a pump having an upstream side and a downstream side and being configured such that it may operate in a supply mode and a reverse mode. In a preferred embodiment the pump is configured as a positive displacement pump and further preferred as a gear pump. The system comprises also a high-pressure conduit system, wherein the central water tank is connected to the upstream side of the pump, wherein the high-pressure conduit system connects the downstream side with the plurality of first consumer assemblies. In addition, the high-pressure conduit system is configured such that the pump, when operating in the supply mode, is capable of supplying water from the downstream side to the buffer tank of each of the first consumer assemblies, and, when the pump is operating in the reverse mode, it is capable of drawing water from the high-pressure conduit system towards the upstream side.

Moreover, the method comprises the following steps:
operating the pump in the supply mode so that water from the central tank is supplied to at least one of the first consumer assemblies wherein the buffer tank of the at least one of the first consumer assemblies is filled,
operating the heater of the buffer tank of the at least one of the first consumer assemblies in such a manner, that the water in the buffer tank of the at least one of the first consumer assemblies is heated up to a predetermined disinfection temperature, and
operating the pump in the reverse mode so that the heated water in the buffer tank of the at least one of the first consumer assemblies passes through a part of the high-pressure conduit system and the upstream side of the pump.

Hence, the system which is operated by the method of the disclosure herein comprises a plurality of first consumer assemblies supplied with water from a central water tank via a pump when being operated in the supply mode, wherein the supply is preferably carried out with the water being at a pressure of at least 2 bar, the specific pressure depending on the size of the aircraft, the number of consumer assemblies being provided with water from the central water tank, the type of equipment, the diameter of the conduits employed in the system, the storage capacity of the buffer tank and the topology of the entire water supply system.

The water flows from the downstream side of the pump to the buffer tanks of the first consumer assemblies which are provided with a heater so that water in the buffer tanks may be heated up to a predetermined disinfection temperature. Furthermore, the pump of the system may also be operated in a so-called reverse mode in which it draws water from the downstream side and, hence, from the high-pressure conduit system and pushes it towards the upstream side and to the central tank or a fill/drain coupling as discussed below. So, the method of the disclosure herein makes use of a pump having these two modes of operation.

Moreover, according to the method of disclosure herein the above system is operated such, that, e.g. after the normal mode of operation was stopped manually, or automatically after a predetermined period of time interval has elapsed, in a first step the pump is operated in the supply mode so that water from the central tank is supplied or conveyed to the buffer tank of at least one of the first consumer assemblies and the respective buffer tank is filled. However, it is also conceivable that more than one or even each of the buffer tanks of the first consumer assemblies are filled with water from the central tank in this step.

In the following step the heater of the buffer tank of the at least one first consumer assembly being filled with water is operated in such a manner that the water is heated up to a predetermined disinfection temperature, namely preferably up to 60° C., more preferably up to 80° C. and most preferably up to 90° C. However, the temperature must not exceed the boiling point and since the boiling point depends on the ambient pressure, the actual temperature to which the water is heated up in the buffer tanks is chosen in accordance with the specific conditions to which the aircraft in question is exposed.

As mentioned before, it is of course also conceivable that the water in more than one of the buffer tanks is heated up to this temperature. In this respect it is to be noted that the buffer tanks are preferably provided with level sensors connected to the control unit so that the control unit will be enabled to activate the heaters only in those buffer tanks that are actually filled with water.

Finally, the pump is operated in the reverse mode, so that the heated water is drawn away from the at least one or more buffer tanks of the first consumer assemblies and passes through a part of the high-pressure conduit system, namely that part connecting the respective first consumer assemblies and the downstream side of the pump, from which it is then further conveyed to the upstream side of the pump.

In this final step at least a portion of the high-pressure conduit system is flushed with water having a temperature sufficiently high to disinfect this portion. Here, when level sensors are provided in the buffer tanks the sensors being connected to the control unit, the reverse mode may be stopped or it is switched to other buffer tanks, when a certain buffer has been emptied.

This method provides for the following advantages. The hot water flush can be carried out without the need for additional equipment and no ground service involving service personnel is required. The disinfection process involving hot water flushing as specified by the method of the disclosure herein can automatically be performed without manual intervention. Hence, the hot water flushing may be carried out without any dedicated operational interruptions, i.e., it can be carried on ground and in principle also during flight. Finally, when the method is carried out such that the heated water expelled at the upstream side of the pump is drained via a fill/drain coupling, the hot water does not come into contact with temperature-sensitive fiber material such as tanks and it becomes possible that hot water at a peak water temperature above 70° C. can be employed which increases the effectiveness of the disinfection process.

In a preferred embodiment, each of the first consumer assemblies is provided with an inlet valve, which is arranged between the buffer tank and the high-pressure conduit system, each of the inlet valves having a closed position and an open position, wherein in the step of operating the pump in the supply mode, water from the central tank is supplied to a plurality of the first consumer assemblies wherein the buffer tanks of the plurality of the first consumer assemblies are filled, wherein the heaters of the buffer tanks of the plurality of first consumer assemblies are operated in such a manner, that the water in the buffer tanks of the plurality of the first consumer assemblies is heated up to a predetermined disinfection temperature, and wherein in the step of operating the pump in the reverse mode, in a first time interval the inlet valves of the plurality of first consumer assemblies are controlled such that the inlet valves of a first portion of the plurality of first consumer assemblies are in the open position with the inlet valves of the first consumer assemblies not belonging to the first portion being in the closed position, and wherein in the step of operating the pump in the reverse mode, in a second time interval following the first time interval the inlet valves of the plurality of first consumer assemblies are controlled so the inlet valves of a second portion of the plurality of first consumer assemblies being different from the first portion are in the open position with the inlet valves of the first consumer assemblies not belonging to the second portion being in the closed position.

In this preferred embodiment, after the buffer tanks of the plurality of first consumer assemblies have been filled with water and the water has been heated up to the disinfection temperature, in a first step the water from the buffer tanks of a first portion of the first consumer assemblies is drawn through a first part of the high-pressure conduit system via the pump operating in the reverse mode. This is achieved by opening only the inlet valves of the first portion of consumer assemblies, whereas the remaining inlet valves are kept in the closed position. In a second step, the heated water stored in the buffer tanks of a second portion of consumer assemblies is drawn so preferably through a second part of the high-pressure conduit system by opening the respective inlet valve. Hence, in this preferred embodiment, different parts of the conduit system are subsequently flushed with heated water from the respective buffer tanks, wherein in each step a higher flow rate through the parts of the high-pressure conduit system currently being flushed will be achieved compared to the case where the entire system is flushed in the same step.

In a further preferred embodiment of the method of the disclosure herein when operating the pump in the reverse mode, in the first time interval the inlet valves of the plurality of first consumer assemblies are controlled so the inlet valve of a first one of the plurality of first consumer assemblies is in the open position with the inlet valves of the remaining first consumer assemblies different from the first one being in the closed position, and in the step of operating the pump in the reverse mode, in the second time interval following the first time interval the inlet valves of the plurality of first consumer assemblies are controlled so the inlet valve of a second one of the plurality of first consumer assemblies being different from the first one is in the open position with the inlet valves of the remaining first consumer assemblies different from the second one being in the closed position.

In this further preferred embodiment, the inlet valves of only a single consumer assembly are subsequently opened whereas the remaining valves being in the enclosed position. In this embodiment, the flow rate in the section of the high-pressure conduit system connecting the consumer assembly the resolve of which being in the open position is maximized. This in turn has the effect that this section of the high-pressure conduit system is treated with water having the highest possible temperature, because due to the high flow rate the decrease in temperature of the heated water passing through that section is minimized.

In a another preferred embodiment of the method of the disclosure herein the connection between the central water tank and the upstream side of the pump comprises a fill/drain coupling and when operating the pump in the reverse mode, so that the heated water in the buffer tank of the at least one of the first consumer assemblies passes through a part of the high-pressure conduit system and the upstream side of the pump, the heated water is passed through the fill/drain coupling and/or to the central water tank. In the first alternative of this preferred embodiment the heated water which has been drawn through at least a part of the high-pressure conduit system and the pump is either discharged through the fill/drain coupling and does not reach the central water tank, so that there is no risk that the central water tank is damaged by heated water having a temperature that is above the critical temperature for the tank. In the second alternative, the heated water is collected in the central water tank so that it may disposed at a later point in time. However, this requires that the temperature of the water reaching the central water tank does not exceed the critical temperature for the tank. In order to achieve this letter requirement, the central water tank may be prefilled with coldwater.

In another preferred embodiment of the method of the disclosure herein the system further comprises second consumer assemblies, each second consumer assembly comprising a supply device and a buffer tank and each second consumer assembly being configured to supply water from the buffer tank via the supply device, wherein the high-pressure conduit system connects the downstream side of the pump with the plurality of second consumer assemblies, with the conduit system being configured such that the pump, when operating in the supply mode, is capable of supplying water from the downstream side to the second consumer assemblies, so that the water is received in the buffer tank of at least one of the second consumer assemblies, wherein when the pump is operated in the reverse mode so that the heated water in the buffer tank of the at least one of the first consumer assemblies passes through a part of the high-pressure conduit system and the upstream side of the pump, the heated water is passed to the central water tank, and wherein the method comprises the following further step of operating the pump in the supply mode so that heated water from the central tank is supplied to at least one of the second consumer assemblies, the heated water being received in the buffer tank of at least one of the second consumer assemblies.

In this preferred embodiment it is made use of the fact that the second consumer assemblies are provided with a buffer tank even if they do not comprise means for heating up the water stored therein. This allows to supply heated water to the second consumer assemblies which was stored before in the central water tank, so that those parts of the high-pressure conduit system connecting the second consumer assemblies and the central can disinfected as well.

Here, it is further preferred that the heated water which was supplied to the second consumer assemblies is then again drawn through the high-pressure conduit system which further improves the efficiency of the disinfection process.

Additionally, or as an alternative, the heated water in the buffer tanks of the second consumer assemblies may also be conveyed to the supply devices of the assemblies so as to disinfect the conduit sections between the buffer tank and the respective supply device which would otherwise not be possible.

Finally, it is preferred that before the pump is operated in the reverse mode and the heated water in the buffer tank of the at least one of the first consumer assemblies is passed to the central water tank, the central tank is drained.

In another aspect of the disclosure herein the above object is solved by an on-board water supply and distribution system of an aircraft for supplying water, the system comprising a central water tank, first consumer assemblies, each first consumer assembly comprising a supply device and a buffer tank and each first consumer assembly being configured to supply water from the buffer tank via the supply device, wherein each of the buffer tanks of the first consumer assemblies comprises a heater configured to heat up water in the buffer tank to a disinfection temperature, a pump having an upstream side and a downstream side and being configured such that it may operate in a supply mode and a reverse mode, a high-pressure conduit system, and a control unit, wherein the central water tank is connected to the upstream side of the pump, wherein the high-pressure conduit system connects the downstream side with the plurality of first consumer assemblies, with the conduit system being configured such that the pump, when operating in the supply mode, is capable of supplying water from the downstream side to the buffer tank of each of the first consumer assemblies, wherein, when the pump is operating in the reverse mode, it is capable of drawing water from the high-pressure conduit system towards the upstream side, the control unit being connected to the pump and the heater of each of the first consumer assemblies and being configured such that in a first step the control unit operates the pump in the supply mode so that water from the central tank is supplied to at least one of the first consumer assemblies wherein the buffer tank of the at least one of the first consumer assemblies is filled, in a second step the control unit operates the heater of the buffer tank of the at least one of the first consumer assemblies in such a manner, that the water in the buffer tank of the at least one of the first consumer assemblies is heated up to a predetermined disinfection temperature, and in a third step the control unit operates the pump in the reverse mode so the heated water in the buffer tank of the at least one of the first consumer assemblies passes through a part of the high-pressure conduit system and the upstream side of the pump.

Hence, the system of the disclosure herein is also configured such that it can firstly be operated so that the buffer tanks of the first consumer assemblies are supplied with water from the central water tank, the water in the buffer tanks is then heated up to a disinfection temperature and finally, when the pump is operated in the reverse mode, the heated water is drawn through the high-pressure conduit system, so that the latter is disinfected. Thus, the system of the disclosure herein provides for the same advantages as the above-described method. The same applies to the preferred embodiments of the system as disclosed herein.

Finally, the above object is also solved by an aircraft comprising a system as described before.

BRIEF DESCRIPTION OF THE DRAWINGS

In the following, the invention will be described further with regard to the example embodiment shown in the drawings, wherein.

DETAILED DESCRIPTION

Figure 1:
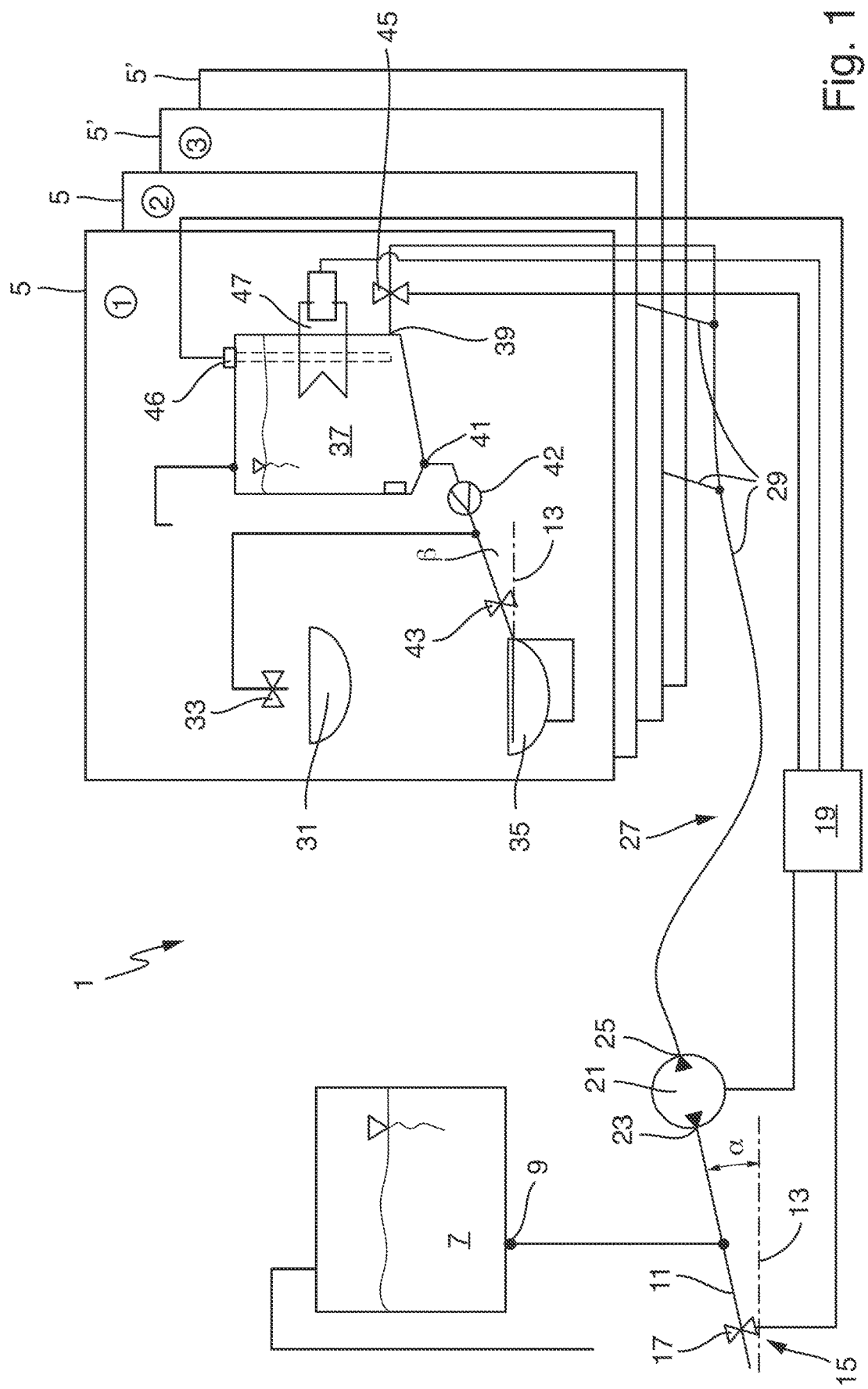
FIG. 1 shows a schematic drawing of an example embodiment of an on-board water supply and distribution system of an aircraft.

As can be taken from FIGS. 1 and 2 the example embodiment of a water supply and distribution system 1 is generally arranged on-board an aircraft 3 and configured such that it supplies a plurality of first consumer assemblies 5 such as sinks and toilets in a lavatory or steam ovens and sinks in a galley, with potable water as will be described in detail below. FIG. 2 only schematically shows the arrangement of the system 1 in the aircraft 3, and several types of arrangements are conceivable.

The water supply and distribution system 1 comprises a central water tank 7 which is provided with a connector 9 at its bottom with the connector 9 being connected to a supply line 11 which is arranged in this example embodiment in such a manner in the aircraft 3 that it includes an angle α with the horizontal 13 when the aircraft 3 is on the ground and in a horizontal position. Generally, the supply line 11 is inclined downwards to a fill/drain coupling 15 which is provided with a valve 17 and which is arranged at the free end of the supply line 11. The valve 17 is connected to a control unit 19 of the system 1 and can remotely be controlled such that it can be switched between a closed and an open position. The control unit 19 may be in the form of a programmable unit so that a software may be uploaded to the control unit 19 which configures the unit 19 so that it may operate the system 1 in the manner as described below. However, it is also conceivable that the control unit 19 is in the form of a programmable computer appropriately connected with the components which need to be controlled so as to perform the method as described below.

Figure 2:
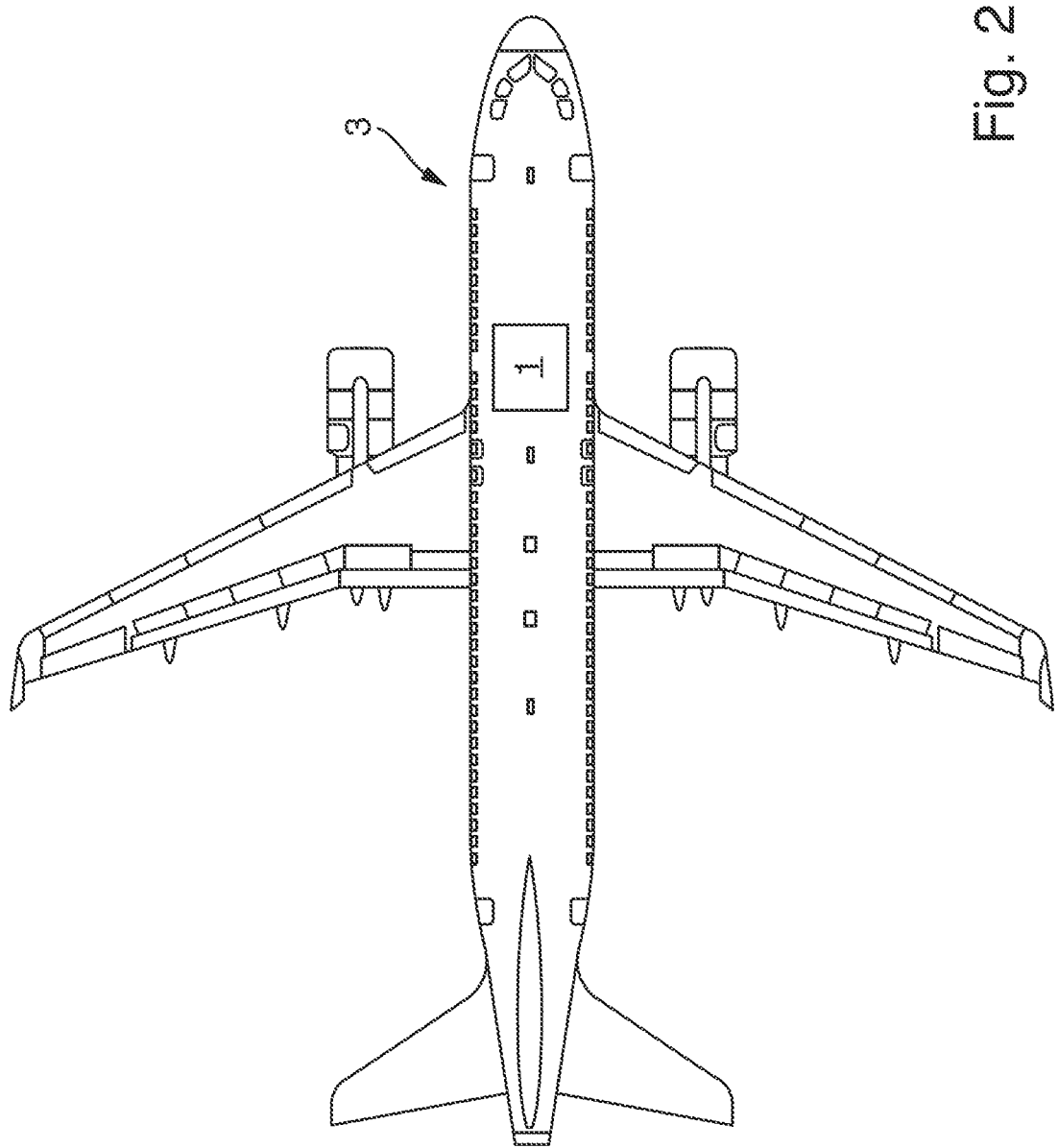
FIG. 2 shows an example embodiment of an aircraft having on-board water supply and distribution system of FIG. 1.

As can further be taken from FIG. 1, the supply line 11 connects the fill/drain coupling 15 with a central pump 21 which is also operatively coupled with the control unit 19 so that the control unit 19 may control the mode of operation of the central pump 21. Preferably, the central pump 21 is configured as a positive displacement pump and further preferred as a gear pump. In particular, the central pump 21 can be operated in a supply mode where it conveys water from its upstream side 23 and the supply line 11 to its downstream side 25 that is connected to a high-pressure conduit system 27 which will be described in detail below. The high-pressure conduit system 27 comprises a plurality of conduits 29 connecting the downstream side 25 of the central pump 21 with the first consumer assemblies 5. Moreover, the central pump 21 may also be operated by the control unit 19 in a so-called reverse mode, in which it draws water from its downstream side 25 and the high-pressure conduit system 27 and conveys it to its upstream side 23 and towards the supply line 11.

The first consumer assembly 5 shown in FIG. 1 is configured as a lavatory with a sink 31 provided with a faucet 33 and a toilet 35 as supply devices. Here, it is to be noted that other forms of first consumer assemblies are conceivable such as galleys having sinks etc., and that the disclosure herein is not limited to consumer assemblies 5 in the form of lavatories.

Furthermore, the first consumer assembly 5 comprises a buffer tank 37 having an inlet 39 and an outlet 41, the latter being connected to the faucet 33 and the toilet 35 via a micro pump 42. As can further be taken from FIG. 1 the line connecting in the outlet 41 with the toilet 35 is also inclined downwards and in this example embodiment includes an angle β with the horizontal 13, when the aircraft 3 is horizontally arranged on the ground. In general, the outlet 41 is arranged at a higher level than the toilet 35. This ensures that when the valve 43 of the toilet 35 is open, the buffer tank 37 may completely be drained via the toilet 35. However, it is also conceivable that when such configuration with a supply device at a lower level than the outlet of the buffer tank 37 cannot be achieved, a pneumatic drainage procedure is conducted, to empty the buffer tank.

In addition, the inlet 39 of the buffer tank 37 of each of the first consumer assemblies 5 is provided with an inlet valve 45 which can be switched between an open and a closed position and which is operatively coupled with the control unit 19, so that the control unit 19 may change the position of the inlet valves 45. The inlet 39 is connected to the downstream side of the central pump 21 by the high-pressure conduit system 27 including the conduits 29. When the aircraft 3 is on the ground, the inlet 39 is arranged at a distance in the vertical direction from the bottom of the buffer tank 37 with the outlet 41. This arrangement of the inlet 39 has the effect that when water is drawn out of the buffer tank 37 via the inlet 39 by the central pump 21 when being operated in the reverse mode, the buffer tank 37 cannot entirely be emptied and particles which have sedimented at the bottom of the buffer tank 37 are not drawn out of the tank 37 and conveyed towards the pump 21. Instead, these particles can only be removed from the buffer tank 37 via the outlet 41.

Moreover, the buffer tanks 37 are provided with level sensors 46 which are connected with the control unit 19 and are configured to monitor the water level in the buffer tank 37 and to provide a corresponding signal for the control unit 19, the signal being indicative for the height of the level in the buffer tank 37.

Finally, each of the buffer tanks 37 of the first consumer assemblies 5 are provided with heaters 47 which are connected to the control unit 19 and configured such that when being activated by the control unit 19 they heat up water within the buffer tank 37 up to a predetermined disinfection temperature, which in this preferred embodiment is 70° C. However, it is within the scope of the disclosure herein that other temperatures may be chosen as predetermined disinfection temperature, but it has turned out that 60° C. is a lower threshold which should not be underrun.

Figure 3:
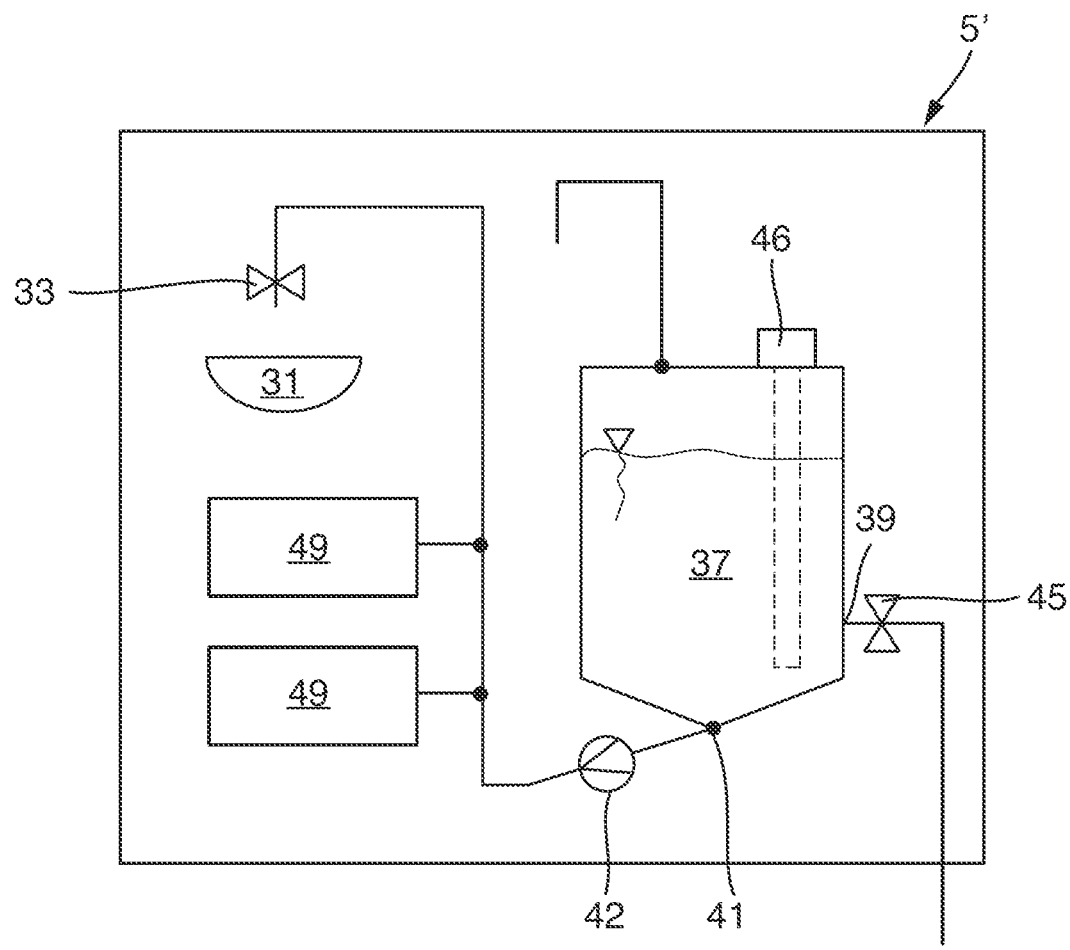
FIG. 3 a schematic drawing of a second consumer assembly of the system of FIG. 1.

Furthermore, it can also be taken from FIG. 1 that the water supply and distribution system 1 comprises a plurality of second consumer assemblies 5' which are shown schematically in FIG. 3 and which differ from the first consumer assemblies 5 merely in that the buffer tank 37 is not provided with a heater 47, so that the water contained in the buffer tank 37 cannot be heated up in a controlled manner by the control unit 19. However, except for this difference the second consumer assemblies 5' do not differ from the first consumer assemblies 5 as described above, i.e., they may be in the form of a galley being provided with a sink 31 and a faucet 33 as well as further devices 49 for producing beverages other configurations are conceivable and within the scope of the disclosure herein.

In the following it will be described how the aforementioned water supply and distribution system 1 of an aircraft 3 is controlled by the control unit 19 so as to perform the inventive disinfection process.

After the normal mode of operation in which the first and second consumer assemblies 5, 5' are supplied with portable water from the central water tank 7 by the central pump 21 operating in the supply mode was stopped manually, or automatically after a predetermined period of time interval has elapsed, the following first step will be initiated by the control unit 19.

In this first step the control unit 19 operates the pump 21 again in the supply mode and the inlet valves 45 of the first consumer assemblies 5 are controlled such so that water from the central tank 7 is supplied to each of the first consumer assemblies 5 wherein the buffer tank 37 of the first consumer assemblies 5 is filled.

In a second step the control unit 19 further operates the heaters 47 of the buffer tanks 37 of the plurality of first consumer assemblies 5 in such a manner, that the water in these buffer tanks 37 is heated up to the predetermined disinfection temperature of 70° C. However, the control unit 19 activates only the heaters 47 of those buffer tanks 37 where the level sensor 46 provides a signal to the control unit 19 that indicates that a sufficient amount of water is in the buffer tank 37.

Subsequently, in a third step the control unit 19 operates the pump 21 in the reverse mode, and in a first time interval the control unit 19 controls the inlet valve 45 of a first portion of the plurality of first consumer assemblies 5, namely of a first one of the first consumer assemblies 5, such that it is in the open position with the inlet valves 45 of other first consumer assemblies 5 being in the closed position, i.e., in this preferred embodiment in the first time interval only the inlet valve 45 of the first one of the first consumer assemblies 5 is in the open position whereas the inlet valves 45 of any other first consumer assembly 5 is closed. However, it is also conceivable, that the first portion of first consumer assemblies 5 in which in the first time interval the inlet valve 45 is opened may include several first consumer assemblies 5.

When the inlet valve 45 of the first one of the first consumer assemblies 5 has been opened by the control unit 19, heated water from its buffer tank 37 is drawn through at least a part of the high-pressure conduit system 27 to the downstream side 25 of the pump 21 and passed to the central water tank 7 with the valve 17 of the fill/drain coupling 15 being closed by the control unit 19. So, the heated water from the buffer tank 37 of the first one of the first consumer assemblies 5 is conveyed to the central water tank 7 and intermittently stored therein. In order to facilitate this, the control unit 19 has controlled the valve 17 of the fill/drain coupling 15 before the third step such that the central water tank 7 was drained, before the heated water from the buffer tank 37 of the first one of the first consumer assemblies 5 was conveyed to it by the pump 21 operating in the reverse mode.

Further, in the third step in a subsequent second time interval following the first time interval, after it has been detected by the level sensor 46 of the first buffer tank 37, that the level of heated water has reached a minimum, the control unit 19 controls the inlet valve 45 of a second portion of the plurality of first consumer assemblies 5 being different from the first portion, namely of a second one of the first consumer assemblies 5 different from the aforementioned first one, such that it is in the open position, with the inlet valves 45 of other first consumer assemblies 5 being in the closed position. Hence, in this second time interval the inlet valve 45 of only the second one of the first consumer assemblies is in the open position whereas the other inlet valves 45 of the first consumer assemblies 5 are closed. Since the pump 21 is still operating in the reverse mode, the heated water from the buffer tank 37 of the second one of the first consumer assemblies 5 is also pumped to the central water tank 7.

In this way, it is continued in the third step until each of the buffer tanks 37 containing heated water has been emptied and at such an amount of heated water has been pumped to the central water tank 7 required to flush those parts of the conduit system 27 not being connected with a consumer assembly having a buffer tank 37 and a heater 47. So, when the third step has been completed, those parts of the high-pressure conduit system 27 interconnecting the downstream side of the pump 21 and the first consumer assemblies 5 were flushed with hot water and thermally disinfected. In this regard it is to be noted that in this embodiment the temperature up to which the water in the buffer tanks 37 is heated up, is chosen such that thermal disinfection is achieved. In this context, thermal disinfection means that the components of the water supply and distribution system, through which potable water is conveyed, is heated up to or above a disinfection temperature at which pathogenic germs on the inner surfaces of the water-bearing parts such as the high-pressure conduit system 27 are eliminated or suppressed by such thermal treatment. Further, the temperature is maintained in the high-pressure conduit system 27 at or above the disinfection temperature for a disinfection period. This treatment suppresses or prevents the formation of hygienically relevant germ colonization (in a biofilm) on the inner surfaces of the high-pressure conduit system 27.

In the following, in a fourth step the control unit 19 again operates the pump 21 in the supply mode, and the heated water from the central tank 7 is pumped through the high-pressure conduit system 27 to the second consumer assemblies 5' not being provided with means to heat up water so that the heated water will be received in the buffer tanks 37 of each of the second consumer assemblies 5'.

After the buffer tanks 37 of the second consumer assemblies 5' have been filled with heated water from the central tank 7, in a fifth step the central pump 21 is again switched to the reverse mode by the control unit 19, and the heated water in the buffer tanks 37 of the second consumer assemblies 5' is subsequently step by step drawn back from each of the buffer tanks 37 to the pump 21 and pushed out of the fill/drain coupling 15 with the valve 1 being opened by the control unit 19. In particular, one inlet valve 45 after the other of the second consumer assemblies 5' is opened with the remaining ones being in the closed position as described above, so that only a sole buffer tank 37 is emptied at a given time.

The system 1 with the control unit 19 being configured so as to control it in the above-described manner provides for the following advantages. The flush with heated water can be carried out without the need for additional equipment and no ground service involving service personnel is required.

The disinfection process can automatically be carried out without manual intervention so that it may be performed without any operational interruptions, i.e., it can be performed on ground and in principle also during flight. Finally, when the method is carried out such that the heated water expelled at the upstream side of the pump 21 is drained via the fill/drain coupling 15, it does not come into contact with temperature-sensitive fiber material such as tanks and it becomes possible that heated water at a peak water temperature above 70° C. is employed when flushing the high-pressure conduit system 27 which increases the effectiveness of the disinfection process.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for operating an on-board water supply and distribution system of an aircraft for supplying water, the system comprising:
   a central water tank;
   first consumer assemblies, each first consumer assembly comprising a supply device and a buffer tank and each first consumer assembly configured to supply water from the buffer tank via the supply device;
   wherein each of the buffer tanks of the first consumer assemblies comprises a heater configured to heat up water in the buffer tank to a disinfection temperature,
   a pump having an upstream side and a downstream side and configured to operate in a supply mode and a reverse mode; and
   a high-pressure conduit system;
   wherein the central water tank is connected to the upstream side of the pump,
   wherein the high-pressure conduit system connects the downstream side with the plurality of first consumer assemblies, with the conduit system configured for the pump, when operating in the supply mode, to supply water from the downstream side to the buffer tank of each of the first consumer assemblies,
   wherein, when the pump is operating in the reverse mode, the pump can draw water from the high-pressure conduit system towards the upstream side,
   the method comprising:
   operating the pump in the supply mode so that water from the central tank is supplied to at least one of the first consumer assemblies wherein the buffer tank of the at least one of the first consumer assemblies is filled;
   operating the heater of the buffer tank of the at least one of the first consumer assemblies so that the water in the buffer tank of the at least one of the first consumer assemblies is heated up to a predetermined disinfection temperature; and
   operating the pump in the reverse mode so that the heated water in the buffer tank of the at least one of the first consumer assemblies passes through a part of the high-pressure conduit system and the upstream side of the pump.

2. The method according to claim 1, wherein each of the first consumer assemblies comprises an inlet valve between the buffer tank and the high-pressure conduit system, each of the inlet valves having a closed position and an open position,
   wherein during operating the pump in the supply mode, water from the central tank is supplied to a plurality of the first consumer assemblies wherein the buffer tanks of the plurality of the first consumer assemblies are filled,
   wherein the heaters of the buffer tanks of the plurality of first consumer assemblies are operated such that the water in the buffer tanks of the plurality of the first consumer assemblies is heated up to a predetermined disinfection temperature, and
   wherein during operating the pump in the reverse mode, in a first time interval the inlet valves of the plurality of first consumer assemblies are controlled such that the inlet valves of a first portion of the plurality of first consumer assemblies are in the open position with the inlet valves of the first consumer assemblies not belonging to the first portion in the closed position, and
   wherein during operating the pump in the reverse mode, in a second time interval following the first time interval the inlet valves of the plurality of first consumer assemblies are controlled such that inlet valves of a second portion of the plurality of first consumer assemblies different from the first portion are in the open position with the inlet valves of the first consumer assemblies not belonging to the second portion in the closed position.

3. The method according to claim 2, wherein during operating the pump in the reverse mode, in the first time interval the inlet valves of the plurality of first consumer assemblies are controlled so the inlet valve of a first one of the plurality of first consumer assemblies is in the open position with the inlet valves of the remaining first consumer assemblies different from the first one in the closed position, and wherein during operating the pump in the reverse mode, in the second time interval following the first time interval the inlet valves of the plurality of first consumer assemblies are controlled so the inlet valve of a second one of the plurality of first consumer assemblies different from the first one is in the open position with the inlet valves of the remaining first consumer assemblies different from the second one in the closed position.

4. The method according to claim 1, wherein the connection between the central water tank and the upstream side of the pump comprises a fill/drain coupling, and wherein when operating the pump in the reverse mode so that the heated water in the buffer tank of the at least one of the first consumer assemblies passes through a part of the high-pressure conduit system and the upstream side of the pump, the heated water is passed through the fill/drain coupling and/or to the central water tank.

5. The method according to claim 1, wherein the system further comprises second consumer assemblies, each second consumer assembly comprising a supply device and a buffer tank and each second consumer assembly being configured to supply water from the buffer tank via the supply device, wherein the high-pressure conduit system connects the downstream side of the pump with the plurality of second consumer assemblies, with the conduit system configured for the pump, when operating in the supply mode, to supply water from the downstream side to the second consumer assemblies, so that the water is received in the buffer tank of at least one of the second consumer assemblies, wherein when the pump is operated in the reverse mode so that the heated water in the buffer tank of the at least one of the first consumer assemblies passes through a part of the high-pressure conduit system and the upstream side of the pump, the heated water is passed to the central water tank, and wherein the method comprises operating the pump in the supply mode so that heated water from the central tank is supplied to at least one of the second consumer assemblies, the heated water being received in the buffer tank of at least one of the second consumer assemblies.

6. The method according to claim 5, comprising operating the pump in the reverse mode so that the heated water in the buffer tank of the at least one of the second consumer assemblies passes through a part of the high-pressure conduit system and the upstream side of the pump.

7. The method according to claim 5, wherein, before the pump is operated in the reverse mode and the heated water in the buffer tank of the at least one of the first consumer assemblies is passed to the central water tank, the central tank is drained.

8. An on-board water supply and distribution system of an aircraft for supplying water, the system comprising:

a central water tank;

first consumer assemblies, each first consumer assembly comprising a supply device and a buffer tank and each first consumer assembly configured to supply water from the buffer tank via the supply device;

wherein each of the buffer tanks of the first consumer assemblies comprises a heater configured to heat up water in the buffer tank to a disinfection temperature, a pump having an upstream side and a downstream side and configured to operate in a supply mode and a reverse mode;

a high-pressure conduit system; and a control unit;

wherein the central water tank is connected to the upstream side of the pump, wherein the high-pressure conduit system connects the downstream side with the plurality of first consumer assemblies, with the conduit system configured for the pump, when operating in the supply mode, to supply water from the downstream side to the buffer tank of each of the first consumer assemblies, wherein, when the pump is operating in the reverse mode, the pump can draw water from the high-pressure conduit system towards the upstream side, the control unit connected to the pump and the heater of each of the first consumer assemblies and configured such that:

in a first step, the control unit operates the pump in the supply mode so that water from the central tank is supplied to at least one of the first consumer assemblies wherein the buffer tank of the at least one of the first consumer assemblies is filled;

in a second step, the control unit operates the heater of the buffer tank of the at least one of the first consumer assemblies such that the water in the buffer tank of the at least one of the first consumer assemblies is heated up to a predetermined disinfection temperature; and in a third step, the control unit operates the pump in the reverse mode so the heated water in the buffer tank of the at least one of the first consumer assemblies passes through a part of the high-pressure conduit system and the upstream side of the pump.

9. The system according to claim 8, wherein each of the first consumer assemblies comprises an inlet valve between the buffer tank and the high-pressure conduit system, each of the inlet valves having a closed position and an open position, wherein the control unit is connected to each of the inlet valves of the plurality of first consumer assemblies to control a position of the inlet valves, wherein the control unit is configured such that:

in the first step, the control unit operates the pump in the supply mode, so that water from the central tank Is supplied to a plurality of the first consumer assemblies wherein the buffer tanks of the plurality of the first consumer assemblies are filled;

in the second step, the control unit operates the heaters of the buffer tanks of the plurality of first consumer assemblies in such a manner, that the water in the buffer tanks of the plurality of the first consumer assemblies is heated up to a predetermined disinfection temperature; and in the third step, the control unit operates the pump in the reverse mode;

wherein in a first time interval the control unit controls the inlet valves of the plurality of first consumer assemblies such that the inlet valves of a first portion of the plurality of first consumer assemblies are in the open position with the inlet valves of the first consumer assemblies not belonging to the first portion in the closed position, and wherein in a second time interval following the first time interval the control unit controls the inlet valves of the plurality of first consumer assemblies such that the inlet valves of a second portion of the plurality of first consumer assemblies different from the first portion are in the open position with the inlet valves of the first consumer assemblies not belonging to the second portion in the closed position.

10. The system according to claim 9, wherein the control unit is configured such that:
in the first step, the control unit operates the pump in the reverse mode;
wherein in the first time interval the control unit controls the inlet valves of the plurality of first consumer assemblies such that the inlet valve of a first one of the plurality of first consumer assemblies is in the open position with the inlet valves of the remaining first consumer assemblies different from the first one in the closed position, and
wherein in the second time interval following the first time interval the control unit controls the inlet valves of the plurality of first consumer assemblies so the inlet valve of a second one of the plurality of first consumer assemblies different from the first one is in the open position with the inlet valves of the remaining first consumer assemblies different from the second one in the closed position.

11. The system according to claim 8, wherein the connection between the central water tank and the upstream side of the pump comprises a fill/drain coupling having a fill/drain valve which has an open position and a closed position and is operatively connected to the control unit,
wherein the control unit is configured such that when the control unit operates the pump in the reverse mode so that the heated water in the buffer tank of the at least one of the first consumer assemblies passes through a part of the high-pressure conduit system and the upstream side of the pump, the control unit controls the fill/drain valve such that:
it is in the open position and the heated water is passed through the fill/drain coupling, or
it is in the closed position and the heated water is passed to the central water tank.

12. The system according to claim 8, comprising second consumer assemblies, each second consumer assembly comprising a supply device and a buffer tank and each second consumer assembly configured to supply water from the buffer tank via the supply device,
wherein the high-pressure conduit system connects the downstream side of the pump with the plurality of second consumer assemblies, with the conduit system configured for the pump, when operating in the supply mode, to supply water from the downstream side to the second consumer assemblies, so that the water is received in the buffer tank of at least one of the second consumer assemblies,
wherein the control unit is configured such that:
when in the third step the control unit operates the pump in the reverse mode so that the heated water in the buffer tank of the at least one of the first consumer assemblies passes through a part of the high-pressure conduit system and the upstream side of the pump, the heated water is passed to the central water tank;
in a fourth step the control unit operates the pump in the supply mode so that heated water from the central tank is supplied to at least one of the second consumer assemblies, the heated water being received in the buffer tank of at least one of the second consumer assemblies.

13. The system according to claim 12, wherein the control unit is configured such that:
in a fifth step the control unit operates the pump in the reverse mode so that the heated water in the buffer tank of the at least one of the second consumer assemblies passes through a part of the high-pressure conduit system and the upstream side of the pump.

14. The system according to claim 12, wherein the connection between the central water tank and the upstream side of the pump comprises a fill/drain coupling having a fill/drain valve which has an open position and a closed position and is operatively connected to the control unit,
wherein the control unit is configured such that:
before it operates the pump in the reverse mode so that the heated water in the buffer tank of the at least one of the first consumer assemblies passes through a part of the high-pressure conduit, the control unit controls the fill/drain valve such that it is brought into the open position so that the central tank is drained.

15. An aircraft comprising a system according to claim 8.

* * * * *